Nov. 10, 1970 W. H. B. THORNTON 3,539774
ELECTRICALLY OPERATED KETTLES
Filed July 5, 1968 3 Sheets-Sheet 1
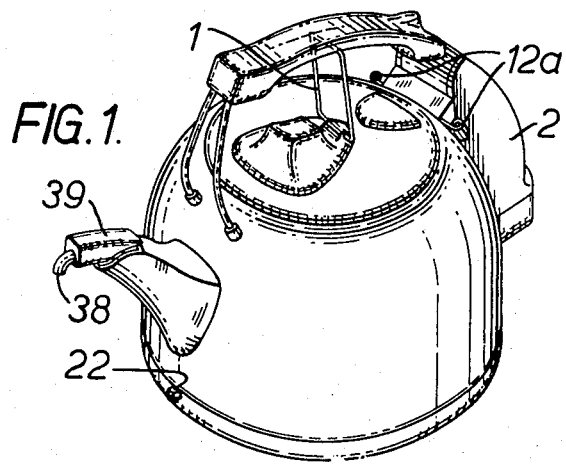
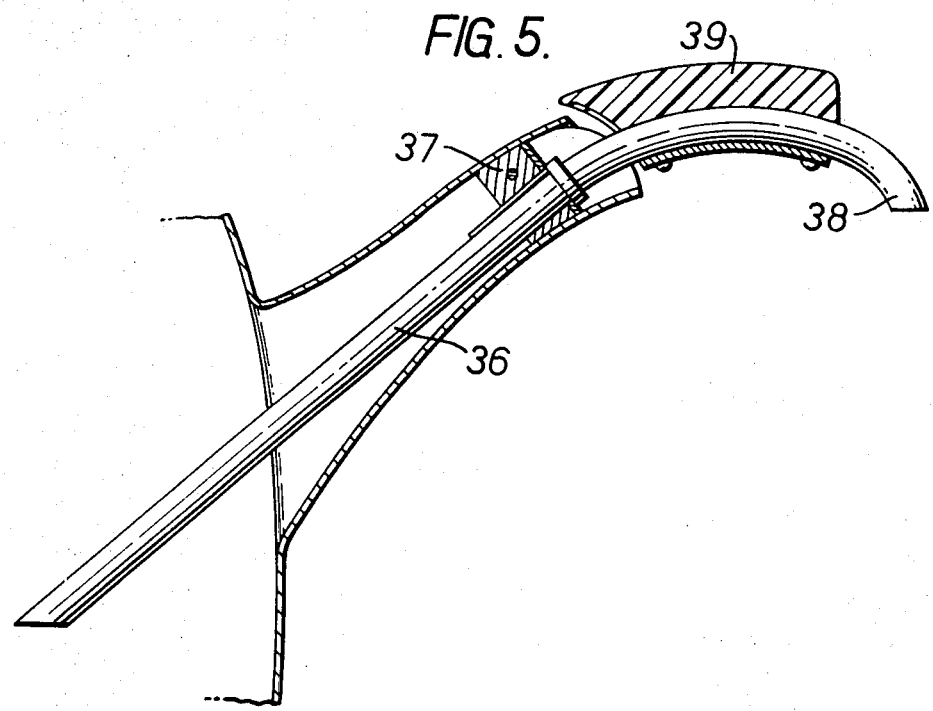

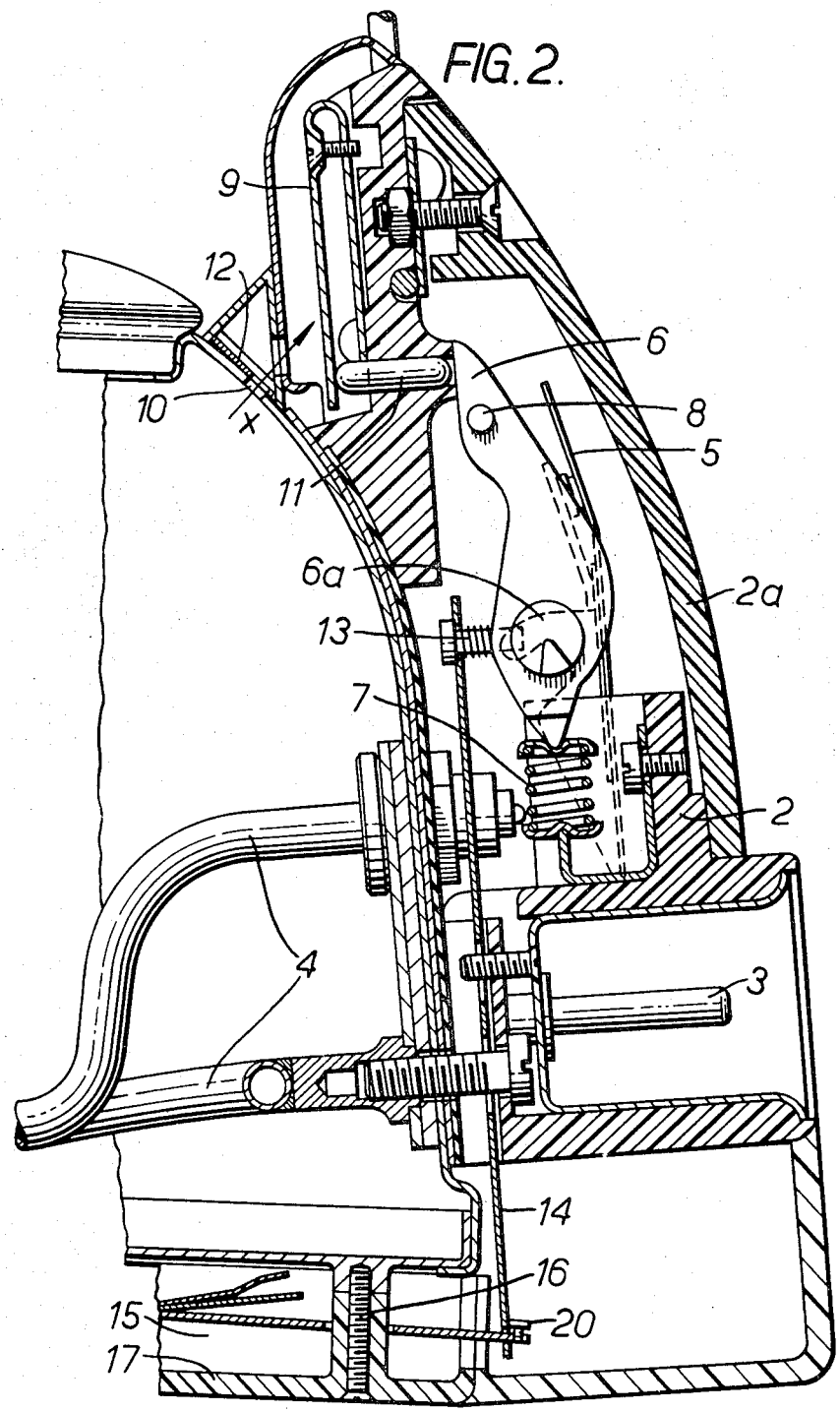

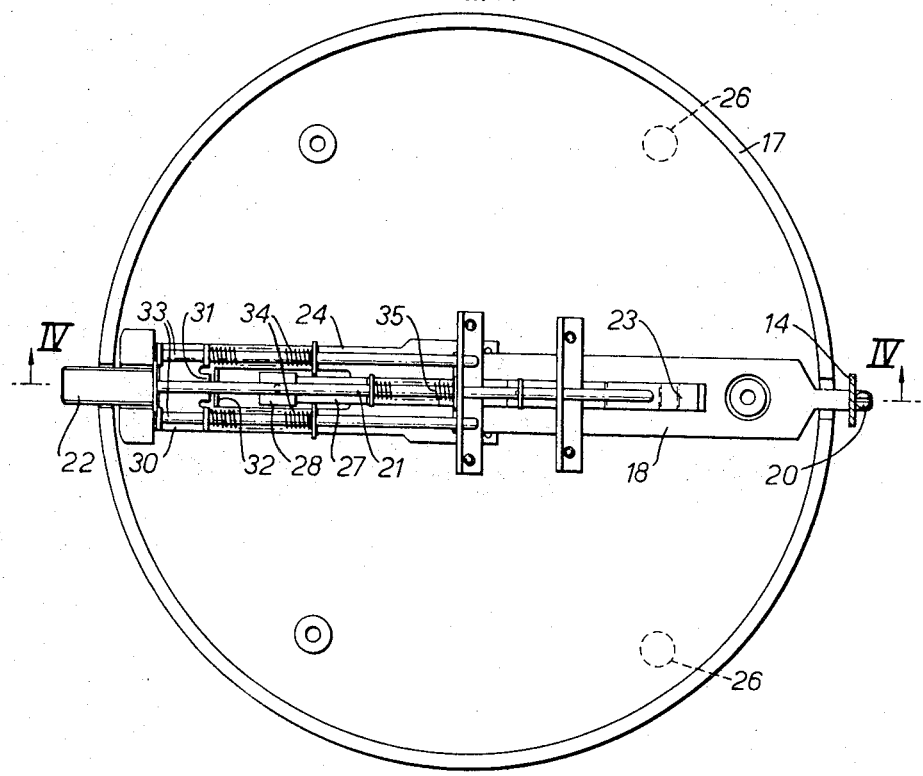
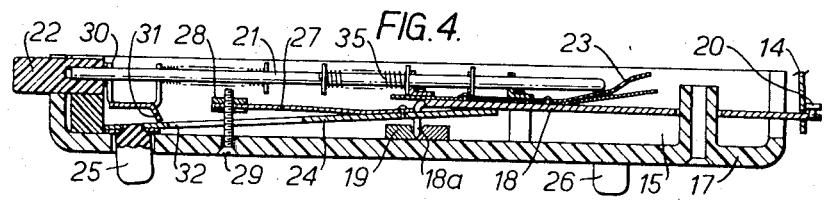

United States Patent Office
3,539,774
Patented Nov. 10, 1970

3,539,774
ELECTRICALLY OPERATED KETTLES
William H. B. Thornton, 28 Fidlers Walk,
Wargrave, Berkshire, England
Filed July 5, 1968, Ser. No. 742,873
Int. Cl. F27d 11/02
U.S. Cl. 219—442                    10 Claims

ABSTRACT OF THE DISCLOSURE

An electrically operated kettle comprising thermal means heated by steam or vapour generated upon boiling and adapted to actuate a switch mechanism to interrupt the current supply to the heating element, and means responsive to the weight of the kettle and operable to break the heater element circuit when the water in the kettle falls below a predetermined value.

---

This invention relates to electrically operated kettles and provides a kettle having considerably increased utility in comparison with kettles at present available. In particular the invention provides a kettle which can be operated to discharge its contents automatically upon boiling, e.g. into a teapot or other receptacle, or can be used for boiling water in the normal manner. Furthermore the improved kettle is equally adaptable to automatic timed operation under tht control of a mechanism in or closely associated with the kettle or under the control of a separate timing mechanism, for example, the timer normally provided with the modern electric cooker, the kettle being capable of being used anywhere where current supply is available and in all instances incorporating the over-riding safety feature of automatic disconnection from the said supply if and when the water in the kettle falls below a predetermined level without the hazards of plug ejection.

According to the invention an electrically operated kettle comprises basically thermal means heated by steam or vapour pressure generated upon boiling and adapted to actuate a switch mechanism to interrupt the current supply to the heating element, and means responsive to the weight of the kettle and operable to break the heater element circuit when the water in the kettle falls below a predetermined level.

Preferably, the kettle incorporates vapour pressure operated means for discharging the contents of the kettle automatically upon boiling, means also being provided for rendering the thermal control inoperative when the automatic discharge is being used, and these and other features of the invention will be more fully understood from the following description of a preferred embodiment thereof, reference being made to the accompanying drawings wherein FIG. 1 is a perspective view of a kettle incorporating the features of the present invention, FIG. 2 is a cross sectional view to an enlarged scale through the switch and thermal control mechanisms, FIG. 3 is a plan view of the basal compartment of the kettle showing the weight-responsive control mechanism mounted therein, FIG. 4 is a sectional elevational on the line IV—IV of FIG. 3, and FIG. 5 is a cross section through the spout structure showing the automatic discharge means in the operative position.

As will be seen in FIG. 1, the invention is illustrated in this instance in its application to a kettle of conventional shape with the filling opening at the upper side closable by a removable lid, said lid for the purpose of the invention being fitted with a fold-down strut or stay 1 which co-operates with the handle when required to lock the lid in position, the lid having a sealing gasket, if desired, for making a tight joint with the rim of the filling opening. Attached to the rear side of the kettle is a hollow insulating moulding 2 fitted with a detachable cover 2a and housing shielded pins 3 for receiving the plug or connector on a supply lead, the moulding also accommodating a switch mechanism of a known type controlling the flow of current to the heater element 4. The switch mechanism comprises a pair of blade contacts, one of which is shown at 5, and an actuating member 6 pivoted at 6a and engaged at its lower end by an over-centre action spring 7 which holds the member 6 in either of its two limit positions. An abutment 8 on the member 6 engages and opens the conntacts 5 when member 6 is swung clockwise from the limit position shown to the other limit position. Mounted at the upper end of the moulding 2 is a bimetallic strip 9 and the kettle wall in this region is provided with a small vapour opening 10, the arrangement being such that when the kettle boils, steam or vapour is forced through the opening as indicated by the arrow x and heats the bimetallic strip which flexes and, through a plunger 11, rocks the actuating member 6 to open contacts 5 and break the heater circuit.

For the purpose of the present invention, a sliding shutter 12 is disposed in the region of opening 10 and is displaceable at will to cut off the opening, so rendering the bimetallic strip inoperative. In addition, an arm 13 is mounted in the actuating member 6 to extend substantially horizontally therefrom and attached to the outer end of the arm is one end of a vertically disposed link 14, the other end of which is connected to control mechanism disposed in a basal compartment 15 of the kettle and which will now be described in detail.

Attached to the underside of the kettle, for example, by screws as indicated at 16 in FIG. 2, is a false bottom 17 which in conjunction with the base plate of the kettle defines the basal compartment 15. Extending diametrically across this compartment is a lever mechanism shown more particularly in FIGS. 3 and 4 and constructed as follows:

Extending inwardly from the rear side of the kettle is a lever 18, the inner end of which is downturned as at 18a and engaged in a grooved block 19 to form a lever pivot, the outer end of the lever having a reduced neck portion which passes through a slot in the lower end of the link 14 and which is retained therein by a screw 20. Any equivalent means may be used for connecting the lever to the link. At the front side of the kettle a control rod 21 extends radially and in alignment with the lever 18, said rod carrying a finger knob 22 at its outer end projecting through a slot in the wall of the false bottom 17 whilst the inner end of the said rod engages a resilient abutment 23 secured to the lever 18. Disposed beneath the control rod is a second lever 24 which has downturned lugs (not shown) near its inner end which are similar to the downturned end 18a of lever 18 and which also engage the grooved block 19 to form a pivot for the lever similar to the pivot of lever 18, the outer end of lever 24 carrying a foot 25 for engagement with a supporting surface. The inner end of lever 24 underlies lever 18. Two other feet 26 are provided fixed to the bottom member 17 in the positions shown. Secured to the lever 24 is one end of a blade spring 27 the other end of which carries a block 28 threaded to receive an adjusting screw 29 extending through the bottom member 17, the arrangement being such that the spring urges the lever 24 downwards with a force determined by the adjustment of the screw 29.

Positioned above the outer end of lever 24 is a U shaped latch member 30 having a downturned lug 31 adapted to be engaged with a slot 32 in the lever 24 as hereafter described, said latch member being supported for sliding movement on a pair of horizontal guide rods 33 and being normally urged into abutment with the inner face of finger knob 22 by springs 34. There is also a further spring 35 encircling the control rod 21 and urging the rod in an outward direction.

Lug 31, in the position of the parts shown in FIG. 2, is disposed above lever 24 outwardly of slot 32.

The kettle also includes an automatic discharge tube 36 adapted to extend through the spout structure, see FIG. 5, and to have a frictional tight fit with an apertured guide block 37 secured within the spout, the outer end of the tube being curved downward to form a discharge nozzle 38 and the curved end of the tube being fitted with hand knob 39 of heat insulating material to facilitate insertion and removal of the tube.

The kettle is used and controlled in the following manner:

Assuming that it is desired to boil water and to discharge it automatically, e.g. for tea or coffe making, the kettle is filled with water, the lid is secured tightly in position and the shutter 12 is adjusted with the aid of finger knob 12a to close the steam vent 10 and render the bimetallic switch inoperative. By pressing on the finger knob 22 the control rod 21 is now displaced inwards and through the resilient abutment 23 depresses lever 18 which rocks clockwise about its pivot at 18a. This lever in turn and through link 14 rocks the switch-actuating member 6 to the position shown in FIG. 2 to permit contacts 5 to close. Inward movement of the finger knob 22 also displaces the latch member 30 to a position where the lug 31 is positioned above the slot 32 and under the weight of the kettle and its contents the lever 24 is free to then move upwards relative to the kettle structure and against the action of the spring 27, lug 31 entering slot 32. The kettle at this time tilts slightly as foot 25 retracts within the basal compartment. When pressure on the finger knob 22 is released the latch 30 is prevented from returning to its initial position by the engagement of lug 31 with the end wall of the slot 32. Thus the kettle occupies a slightly inclined position and the water is heated in the normal manner. When the water boils, it discharges automatically through the discharge tube 36 under the steam pressure created within the kettle, and when the water in the kettle falls to a predetermined level the lever 24 will be moved downward under the action of spring 27 sufficient to extract lug 31 from slot 32 and thereby to release the latch lug 31. The latch 30 is thereby freed and the control rod returns to its initial position. The inner end of the lever 24 will also be exerting upward pressure on the lever 18 and, through link 14, rocks the switch-actuating member 6 to its other limit position so breaking the heater circuit.

Should it be desired to use the kettle for simple heating or boiling without automatic discharge, the discharge tube 36 is removed and the shutter 12 is set to leave the vent 10 open. The lid need not be clamped in position but it is still necessary to press inwards on knob 22 and exert downward pressure on the kettle to effect connection of the heater circuit through the lever control mechanism. When the water boils the bimetal will operate after, say, 10 to 15 seconds, to break the heater circuit, but should the shutter be inadvertently left in the vent-closing position, the kettle is still safeguarded as the weight-operated control mechanism in the base will break the heater circuit as soon as boiling reduces the water in the kettle to a predetermined level. Said control mechanism also operates in the same manner to safeguard the kettle if an attempt is made to switch the kettle on without charging it with water. It will also be noted that unless the finger knob is pressed inwards the latch 30 prevents the outer end of lever 24 lifting so that the kettle cannot unintentionally be switched on by downward pressure on the kettle.

The kettle may be connected to a current supply through any form of timer such that it will be switched on, for example, for the automatic making of tea or coffee at any desired time, and the invention provides an appliance capable of meeting the requirements of water heating, tea making and like operations with complete safety of operation.

It will be understood that the invention has been illustrated in relation to a standard type of kettle purely by way of example, and the kettle or water container may be of any desired shape or form that can embody and accommodate the switch mechanism and control means therefor.

Whilst I have mentioned use of the kettle according to the invention under control of separate time control mechanism it will be appreciated that the construction described and illustrated readily lends itself to the incorporating of timing mechanism in or in association with the handle structure or switch housing as disclosed in my patent specification No. 1,037,088, thereby providing in a single appliance all the advantageous features of normal kettles, automatic discharge kettles or boilers, tea and coffee making appliances and similar apparatus.

I claim:

1. An electrically operated kettle having a liquid containing space and an electrical heating element for heating the liquid in said space, a circuit for energizing said element, heat sensitive means in said circuit automatically responsive to steam or vapor generated when the liquid within the kettle is boiling to interrupt said circuit, and means responsive to the weight of said kettle and liquid contents adapted to interrupt said circuit when the liquid in said space falls below a predetermined amount.

2. An electrically operated kettle as claimed in claim 1, wherein the kettle incorporates vapour pressure operated means for discharging the contents of the kettle automatically upon boiling, means also being provided for rendering the heat sensitive means inoperative when the automatic discharge means is being used.

3. An electrically operated kettle as claimed in claim 2, wherein the automatic discharge means comprises a removable discharge tube adapted to extend downwards through the kettle spout and into the body of the kettle, the upper end of the tube being curved downward to form a discharge nozzle and the tube having a friction tight fit in an apertured guide block within the spout and which closes off the remainder of the spout when said discharge element is used.

4. An electrically operated kettle as claimed in claim 1, said circuit including switch means operably connected to both said heat sensitive means and said weight responsive means.

5. An electrically operated kettle as claimed in claim 4, said weight responsive means comprising manual means for closing said switch means and setting said weight responsive means for automatic operation.

6. An electrically operated kettle as claimed in claim 1 in which the heat sensitive means comprises a bimetallic strip having operative connection with a switch in said circuit, a vent being provided through which steam is directed onto the bimetallic member, and the means for rendering the thermal control inoperative comprising a manually-displaceable shutter operable to close the said vent.

7. An electrically operated kettle as claimed in claim 1, wherein said heat sensitive means and the weight-operated control means actuate a common switch mechanism in the heater element circuit.

8. An electrically operated kettle as claimed in claim 1, wherein said weight responsive means is mounted on a false bottom structure attached to and forming with the bottom of the kettle a basal compartment housing said weight responsive means.

9. An electrically operated kettle as claimed in claim 1, wherein said circuit contains a switch having an actuating member and said weight responsive means comprises a lever having operative connection with said switch actuating member, a control rod manually displaceable to rock said lever and actuate said switch, a spring-loaded lever having a downwardly projecting supporting foot and movable inwardly relative to the kettle under the weight of the kettle and its contents, a shiftable latch member normally preventing inward movement of said foot-supporting lever but which, when the control rod is actuated, is displaced to a position in which it permits said inward movement of the foot-supporting lever and is thereafter retained in the displaced position by said foot-supporting lever until loss of weight of the kettle by discharge of liquid therefrom results in the foot-supporting lever being moved outwards by its spring to free said latch for return to its initial position.

10. An electrically operated kettle as claimed in claim 9, in which said switch means and said heat sensitive means are mounted in a hollow insulated moulding attached to the rear side of the kettle, said weight responsive means having operative connection with said switch means through a vertically disposed link connected to the switch-actuating member.

References Cited

UNITED STATES PATENTS

| | | | |
|---|---|---|---|
| 1,804,130 | 5/1931 | Starr | 219—449 |
| 2,369,932 | 2/1945 | Allen | 219—441 |
| 2,440,128 | 4/1948 | Sullivan | 219—440 X |
| 2,528,191 | 10/1950 | Turner | 219—441 |
| 2,896,062 | 7/1959 | Kueser | 219—441 |
| 3,026,402 | 3/1962 | Russell | 219—441 |

FOREIGN PATENTS 202,689  11/1954  Australia.

VOLODYMYR Y. MAYEWSKY, Primary Examiner

U.S. Cl. X.R.

99—281; 219—494